US 7,664,336 B2

(12) United States Patent
Zhang et al.

(10) Patent No.: US 7,664,336 B2
(45) Date of Patent: Feb. 16, 2010

(54) VIDEO NOISE REDUCTION

(75) Inventors: Zhengyou Zhang, Bellevue, WA (US); An Xu, Beijing (CN); Chunhui Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 765 days.

(21) Appl. No.: 11/340,313

(22) Filed: Jan. 26, 2006

(65) Prior Publication Data
US 2007/0172144 A1 Jul. 26, 2007

(51) Int. Cl.
*G06K 9/40* (2006.01)
(52) U.S. Cl. .................. 382/260; 382/274; 382/275; 358/3.26; 358/3.27
(58) Field of Classification Search ............... 382/260, 382/274, 275; 358/3.26, 3.27, 463
See application file for complete search history.

(56) References Cited

U.S. PATENT DOCUMENTS

| | | | | |
|---|---|---|---|---|
| 5,414,626 | A | * | 5/1995 | Boorse et al. ............... 701/32 |
| 5,546,134 | A | * | 8/1996 | Lee ............................ 348/673 |
| 5,568,208 | A | * | 10/1996 | Van de Velde ............. 351/221 |
| 5,974,192 | A | * | 10/1999 | Kundu ....................... 382/260 |
| 5,993,001 | A | * | 11/1999 | Bursell et al. .............. 351/212 |
| 6,134,339 | A | * | 10/2000 | Luo ............................ 382/115 |
| 6,548,800 | B2 | | 4/2003 | Chen et al. ................ 250/208.1 |
| 6,577,956 | B1 | * | 6/2003 | Shams ......................... 702/19 |
| 6,636,220 | B1 | | 10/2003 | Szeliski et al. ............. 345/475 |
| 6,674,882 | B1 | * | 1/2004 | Shams ....................... 382/129 |
| 6,847,391 | B1 | * | 1/2005 | Kassatly .................. 348/14.01 |
| 2004/0258308 | A1 | | 12/2004 | Sadovsky et al. .......... 382/190 |
| 2005/0002457 | A1 | | 1/2005 | Xu et al. ................. 375/240.19 |
| 2005/0105819 | A1 | | 5/2005 | Burch et al. ................ 382/264 |
| 2005/0201634 | A1 | | 9/2005 | Yuan et al. ................. 382/274 |
| 2005/0219391 | A1 | | 10/2005 | Sun et al. ................... 348/255 |
| 2005/0243177 | A1 | | 11/2005 | Kang et al. ............... 348/207.1 |

OTHER PUBLICATIONS

"Video Enhancement Using Per-Pixel Virtual Exposures", Eric P. Bennett and Leonard McMillan, The University of North Carolina at Chapel Hill, 8 pages, Jul. 2005.

* cited by examiner

*Primary Examiner*—Yosef Kassa
(74) *Attorney, Agent, or Firm*—Westman, Champlin & Kelly, P.A.

(57) ABSTRACT

A video clip is processed by selecting a plurality of video frames of the video clip. A plurality of the pixels of the selected video frames are modified to form modified video frames. The modification to each of the plurality of the pixels is based on the intensity of the pixel, a change in the intensity of the pixel from the corresponding pixel in at least one related video frame, and the intensity of the corresponding pixel. A second video clip is formed that comprises the modified video clips.

20 Claims, 3 Drawing Sheets

VIDEO NOISE REDUCTION

BACKGROUND

Digital video involves the sensing of light rays emitted from objects within a scene by an image sensor, such as a complementary metal oxide semiconductor (CMOS) sensor. Individual images captured by the image sensor form video frames of a video clip. Each video frame is formed of thousands of individual pixels defined by color and intensity data generated by the image sensor.

Difficulties arise when attempting to capture video images under low light conditions. Often, the images are underexposed as a result of not exposing the image sensor to sufficient amounts of light. The small amount of light being sensed by the image sensor produces a low image signal (i.e., video frames having pixels with low intensities). Unlike during good light conditions where the image signal is strong (high pixel intensities), the noise of the image sensor under low light conditions becomes relatively large compared to the low image signal. As a result, the underexposed images generally have low signal-to-noise ratios (SNR). Such low SNR images are generally low quality images that often appear grainy.

Underexposure may be corrected by increasing the size of the image sensor, but sensor cost increases with size.

Underexposure can also be somewhat corrected by exposing the image sensor for a longer period, for example, by using a lower shutter speed. The longer exposure time allows the sensor to capture more light and, thus, increase the image signal. However, lower shutter speeds often result the blurring of images in the video frames caused by the movement of the camera while capturing a scene of still objects, or capturing moving objects within the scene.

The discussion above is merely provided for general background information and is not intended to be used as an aid in determining the scope of the claimed subject matter.

SUMMARY

A video clip is processed by selecting a plurality of video frames of the video clip. A plurality of the pixels of the selected video frames are modified to form modified video frames. The modification to each of the plurality of the pixels is based on the intensity of the pixel, a change in the intensity of the pixel from the corresponding pixel in at least one related video frame, and the intensity of the corresponding pixel. A second video clip is formed that comprises the modified video clips.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The claimed subject matter is not limited to implementations that solve any or all disadvantages noted in the Background.

DETAILED DESCRIPTION

In the following description, although the subject matter is described in language specific to structural features and/or methodological acts, it is to be understood that the subject matter defined in the appended claims is not necessarily limited to the specific features or acts described below. Rather, the specific features and acts described below are disclosed as exemplary forms of implementing the claims.

Exemplary Computing Environment

The exemplary computing system environment described below can have a configuration that is suitable for, but not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, mobile computing devices, mobile phones, digital cameras, digital video cameras, and the like.

The invention may be described in the general context of computer-executable instructions, such as program modules, being executed by a computer. Generally, program modules include routines, programs, objects, components, data structures, etc. that perform particular tasks, method steps, or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1:
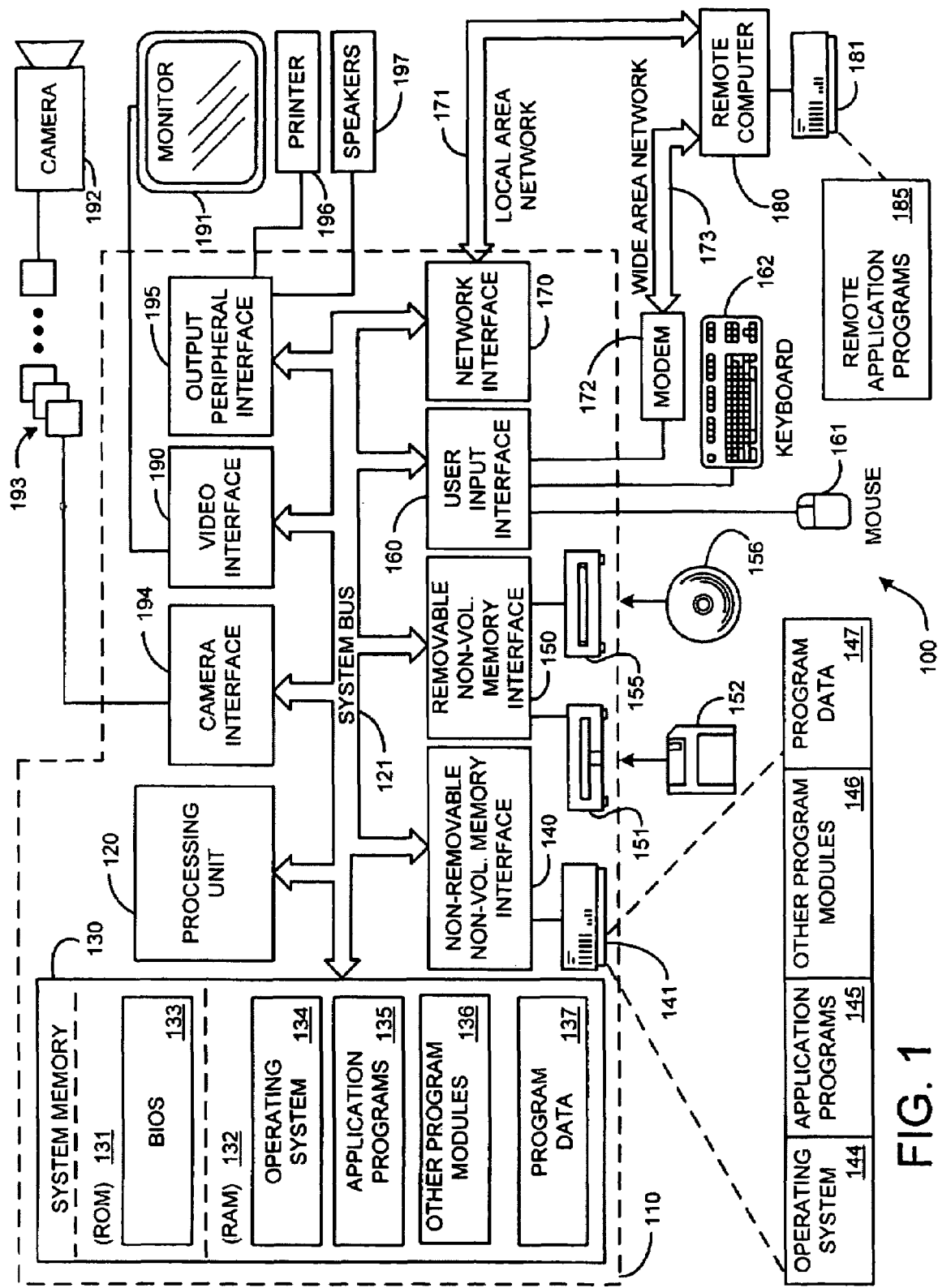
FIG. 1 is a diagram depicting a general purpose computing device constituting an exemplary system for implementing the present invention.

FIG. 1 illustrates an example of a suitable computing system environment 100 in which video processing embodiments may be implemented. The computing system environment 100 is only one example of a suitable computing environment and is not intended to suggest any limitation as to the scope of use or functionality of the subject matter to which the claims pertain. Additionally, the exemplary computing environment 100 should not be interpreted as having any dependency or requirement relating to any one or combination of components illustrated in the exemplary operating environment 100. Accordingly, embodiments of the exemplary computing environment include one or more of the components depicted in FIG. 1 and described below and other computing related components that may be necessary for the particular application of the computing related components that are not depicted in FIG. 1.

With reference to FIG. 1, embodiments of an exemplary system for implementing embodiments of the invention include a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other embodiments of removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Of particular significance to the present invention, a video camera 192 (such as a digital video camera) capable of recording or streaming a video clip comprising sequence of video frames 193 can also be included as an input device to the personal computer 110. The video camera 192 includes an image sensor, such as a complementary metal oxide semiconductor (CMOS) sensor for capturing light rays emitted from objects within a scene, from which the video frames 193 are generated. While just one camera is depicted in FIG. 1, multiple cameras could be included as input devices to the personal computer 110.

In one embodiment, the video clip from the one or more cameras 192 are input into the computer 110 via an appropriate camera interface 194. This interface 194 is connected to the system bus 121, thereby allowing the images to be routed to and stored in the RAM 132, or one of the other data storage devices associated with the computer 110. However, it is noted that video clip data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In one embodiment, the camera 192 includes one or more components of the exemplary computing environment 100 discussed above for implementing embodiments of the invention within the camera 192. Accordingly, embodiments for performing video processing including video noise reduction can be performed within the camera 192.

Video Noise Reduction

The exemplary operating environment having now been discussed, the remaining part of this description section will be devoted to a description of embodiments for performing video noise reduction to improve the signal-to-noise ratio (SNR) of video under low light conditions.

When a video clip has a low SNR, the embodiments of the method can operate to increase the SNR of at least a plurality of selected video frames of the video clip and improve image quality of the video clip. In accordance with embodiments of the method, each of a plurality of the pixels of each of the selected video frame are modified to form a modified video frame based on at least the corresponding pixel of one or more preceding video frames. However, the use of the corresponding pixel of the preceding frames is limited based on the detection of motion in the image represented by the pixels. That is, in accordance with one embodiment, the change in the intensity of the pixel of the selected video frame from the corresponding pixel in the adjoining video frame is taken into account when determining whether, or to what extent, to modify the pixel of the selected video frame.

Embodiments of a method of processing a video clip will be discussed with reference to FIGS. 2 and 3. As illustrated in the flow diagram of FIG. 2, a first video clip 200 is provided or accessed.

Figure 3:
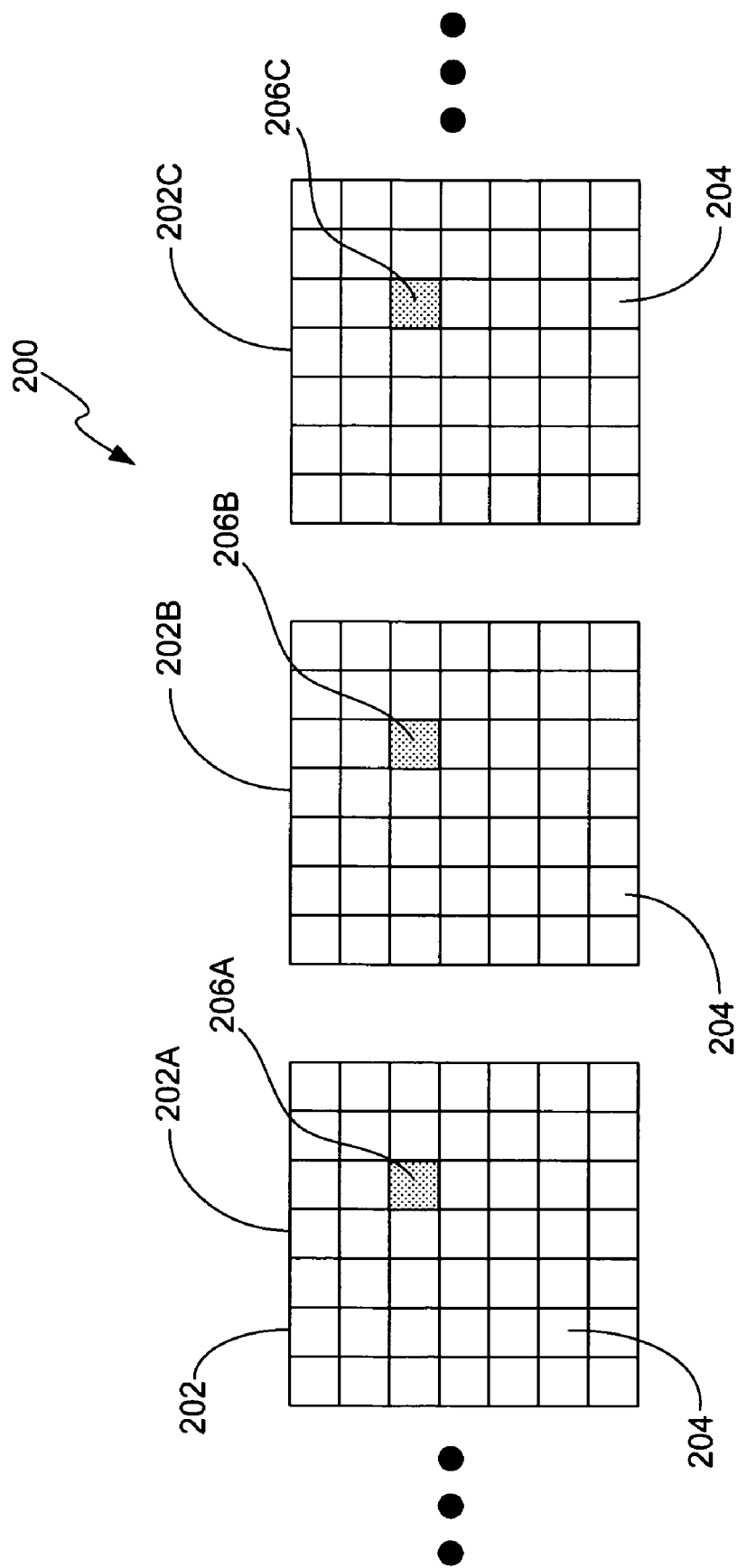
FIG. 3 is a simplified diagram of video frames of a video clip.

FIG. 3 is a simplified diagram of an exemplary digital video clip 200 which can be a streamed video clip, a video clip stored in a computer readable memory, or an analog video signal that is converted into a streamed digital video clip. The video clip comprises a plurality of video frames, generally designated as 202, taken at a frame rate (frames/second) that is determined by a shutter speed of the video camera. The image sensor of the video camera includes a plurality of pixels, each of which captures light from objects of a scene. The amount of light captured by each of the pixels is quantified as an intensity. Pixels 204 that form the image of each video frame 202 correspond to the pixels of the image sensor and each include the intensity as output from the image sensor.

For each pixel 204 of one of the video frames 202 there is a corresponding pixel 204 in another video frame 202. For instance, pixel 206B is located in the video frame 204B taken at time t. The pixels corresponding to pixel 206B include pixel 206A in the video frame 202A taken at time t−1, the pixel 206C taken at time t+1, and the spatially corresponding pixel in other video frames 202 of the video clip 200. Accordingly, the use of the term "corresponding pixel" and the like is intended to describe these spatially related, but temporally displaced, pixels 204 of the video frames 202.

Additionally, each video frame 202 of the first video clip 200 has at least one adjoining video frame 202. For instance, the adjoining video frames for video frame 202B includes the adjoining video frame 202A, which precedes the video frame 202B, and video frame 202C, which succeeds the video frame 202B.

Figure 2:
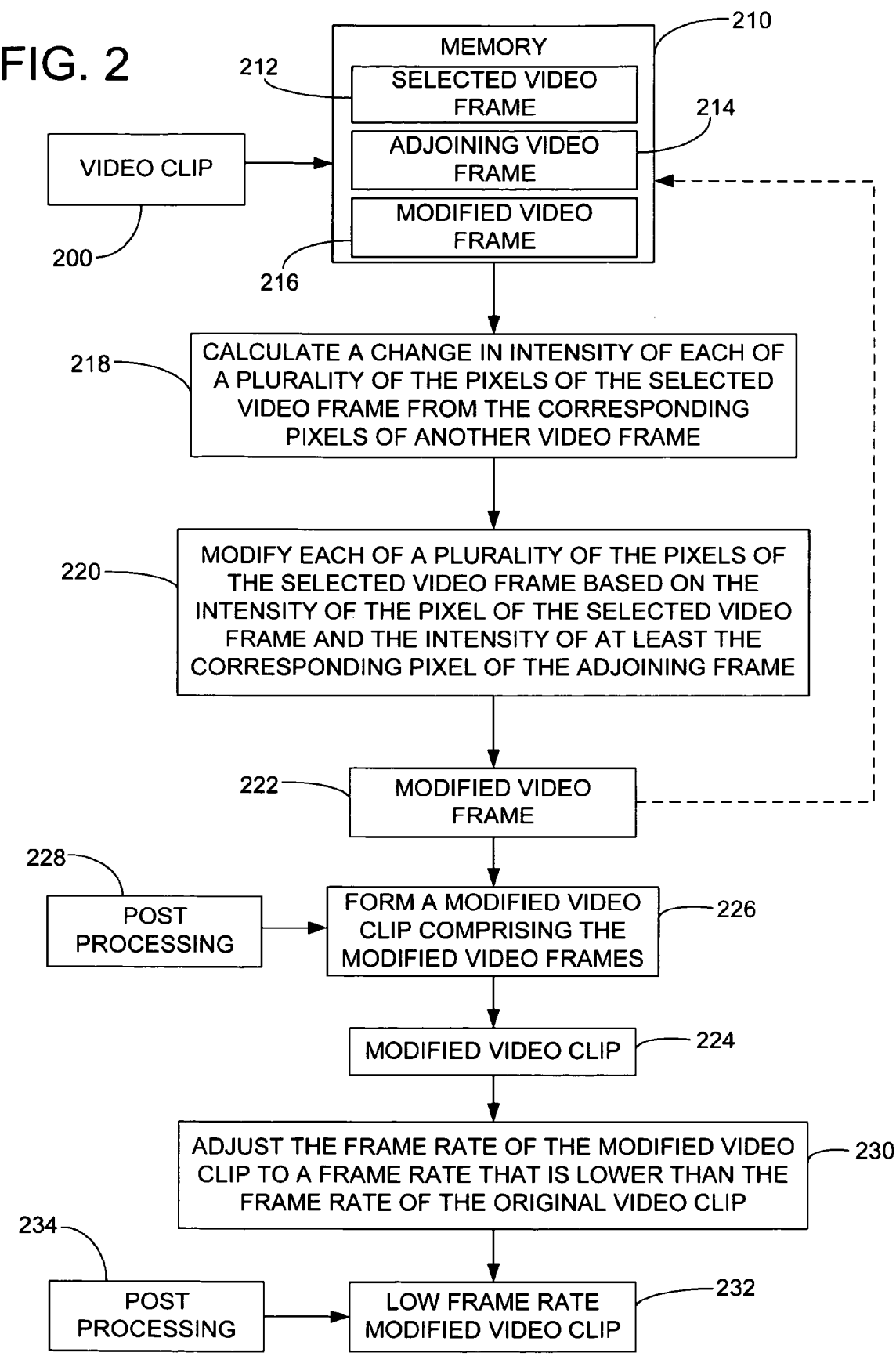
FIG. 2 is a flow diagram of embodiments of a method of processing a video clip.

In one embodiment, a plurality of the video frames 202 are stored in a computer readable memory or buffer 210, shown in FIG. 2. In one embodiment, only one selected video frame 212 (such as 204B) is stored in the memory 210 and the adjoining video frame 214 (such as 204A) that precedes the selected video frame 212 are stored in the memory 210. This embodiment avoids the memory and processing burden of storing a large number of video frames 202 in the memory 210. One embodiment includes storing a modified video frame 216 corresponding to the adjoining video frame 214 of the video clip 200 in the memory 210 that is generated in accordance with the embodiments described below.

As illustrated at 218, one step of the method includes calculating a change in the intensity of each of a plurality of the pixels 204 of the selected video frame 212 from the corresponding pixels 204 of the other video frame (e.g., the adjoining video frame 214). The change generally relates to a motion of the image in the selected video frame 212.

In one embodiment, the video frame from which the change is calculated includes the adjoining video frame 214 of the selected video frame 212. Alternatively, the video frame from which the change is calculated includes the modified video frame 216 corresponding to the adjoining video frame 214.

One embodiment of the calculation of the change at 218 involves calculating a difference between the intensity of the pixel (e.g., pixel 206B) of the selected video frame 212 and the intensity of the corresponding pixel (e.g., 206A) in the adjoining video frame 214 or the modified adjoining video frame 216.

In one embodiment, the change at each pixel of the selected video frame 212 is measured by computing the dense optical flow field of the selected video frame 212 from the adjoining video frame 214 or the modified adjoining video frame 216, in accordance with known techniques. In general, the optical flow field includes a flow vector field that warps the adjoining video frame 214 or the modified adjoining video frame 216 to the selected video frame 212, or vice versa. The magnitude of the flow vector for each pixel of the selected video frame 212 indicates how much the pixel has changed from the adjoining video frame 214 or the modified adjoining video frame 216.

In one embodiment, the change for each of the pixels of the selected video 212 frame is equal to the magnitude v of the flow vector for the pixel. When the magnitude v is zero, there is no change between the pixel of the selected video frame 212 and the corresponding pixel of the adjoining video frame 214 or the modified adjoining video frame 216 and, in accordance with the exemplary equations provided below, the change c can be set to 1. In one embodiment, when the magnitude v is not equal to zero, the change c is set to 0.

In accordance with one embodiment, the value for the change c ranges from 0, representing significant change in the intensity of the pixel of the selected video frame 212 from the intensity of the corresponding pixel of the adjoining video frame 214 or 216, to 1 representing no change in the intensities of the pixel. In one embodiment, the value for the change c is determined based on a comparison of the magnitude v of the flow vector for the pixel to a threshold change or magnitude V, as provided in Eq. 1, where the magnitude of v is a value from 0 to 1. The threshold change V is set to a value that indicates an acceptable amount of change in the intensity of the pixel of the selected video frame 212 from the intensity of the corresponding pixel of the adjoining video frame 214 or 216.

$v=0, c=1$ (no change);

If $v<V, c=(V-v)/V$; and

If $v \geq V, c=0$ (significant change)  Eq. 1

Thus, Eq. 1 allows for a range of values of c between 1 and 0, but sets c to 0 when c reaches a predetermined relationship to the threshold change V. In the exemplary relationship provided in Eq. 1, c is set to zero when the magnitude v is greater than the threshold change V.

As will be shown below, one embodiment includes not modifying the intensity of the pixel of the selected video frame when the change c indicates significant movement between the images of the selected video frame and the adjoining video frame. In other words, the intensity of the pixel of the selected video frame is modified only when the change reaches a predetermined relationship (e.g., v<V, v V, etc.) to the threshold change V. Other predetermined relationships can also be used depending on the manner in which the change is calculated.

In accordance with another embodiment, the change is calculated based on a normalized cross-correlation using a small neighborhood of pixels (N) around the pixel of the selected video image for which the change is being calculated. The normalized cross-correlation provides a value C between 1 (no change) and −1 (completely opposite). The normalized cross correlation C is calculated in accordance with Eq. 2.

$$C = \frac{1}{N\sigma_1\sigma_2} \sum_{i=1}^{N} (I_1(i) - \bar{I}_1(i))(I_2(i) - \bar{I}_2(i)) \qquad \text{Eq. 2}$$

where $I_1(i)$ and $I_2(i)$ are, respectively, intensities of pixel i in the selected video frame and in the adjoining video frame, N is the number of pixels in a block of pixels that includes the target pixel i for which the change is being calculated, and $\bar{I}_1(i)$ and $\bar{I}_2(i)$ are the means calculated in accordance with Eq. 3, and $\sigma_1$ and $\sigma_2$ are the standard deviations given by Eq. 4. For example, the normalized cross correlation can be taken for N=25 (e.g., 25 of a 5×5 square of pixels) or other value. The cross correlation C is representative of the change for one of the pixels of the block of selected pixels, and preferably the center pixel of the block of pixels.

$$\bar{I} = \frac{1}{N} \sum_{i=1}^{N} I(i) \qquad \text{Eq. 3}$$

$$\sigma^2 = \frac{1}{N} \sum_{i=1}^{N} (I(i) - \bar{I}(i))^2 \qquad \text{Eq. 4}$$

In one embodiment, the N pixels used in Eqs. 2-4 can be pared down to account for sensor noise. For example, the two pixels having the highest and lowest intensities in the neighborhood of the target pixel used in Eqs. 2-4 can be ignored and the value for N reduced accordingly. Other methods can also be used to eliminate pixels in the neighborhood of the target pixels to provide better results for the cross-correlation C.

In one embodiment, the change c is determined from the cross-correlation change in accordance with Eq. 5. It is understood that other relationships can be used between the cross correlation C and the change c instead of the exemplary piecewise liner function of Eq. 5.

c=C, if C>0; and c=0, otherwise   Eq. 5

Accordingly, the change c will be 1 for no change between the pixel of the selected video frame 212 and the corresponding pixel of the adjoining video frame 214 or 216, between 0 and 1 for small differences between the pixel of the selected video frame 212 and the corresponding pixel of the adjoining video frame 214 or 216, and 0 for large changes.

In another embodiment, the change c for each of the plurality of pixels of the selected video frame 212 is based on a plurality of preceding adjoining frames 214 or 216. In one embodiment, the change c for the pixel of the selected video frame 212 is calculated in accordance with Eq. 6 for the desired number of preceding frames (i.e., from 1 to n preceding frames).

$$c = W_1 {}^*c_1 + W_2 {}^*c_2 + W_3 {}^*c_3 + W_4 {}^*c_4 + \ldots W_n {}^*c_n \qquad \text{Eq. 6}$$

In Eq. 6, $c_1$ represents the change between the intensity of the pixel of the selected video frame 212 (e.g., video frame 202C) and the corresponding pixel of the adjoining video frame (e.g., video frame 202B), $c_2$ represents the change in intensity of the pixel of the selected video frame 212 and the corresponding pixel in the next preceding video frame (e.g., video frame 202C), etc. The values $W_1$ through $W_n$ represent weights that are applied to each of the changes based on their position relative to the selected video frame 212. In one embodiment, the video frames that are closer (i.e., temporally) to the selected video frame 212 receive higher weighted values than the video frames that are located farther from the selected video frame 212. In one embodiment, the weight values W add up to 1. Exemplary weighted values are $W_1=0.6$, $W_2=0.2$, $W_3=0.15$ and $W_4=0.05$, where 4 preceding video frames are used.

As indicated at 220 of FIG. 2, after the changes are calculated for at least a plurality of the pixels of the selected video frame 212, each of a plurality of the pixels of the selected video frame 212 are modified based on the intensity of the pixel (e.g., pixel 206B) of the selected video frame and the intensity of at least the corresponding pixel (e.g., 206A) of the adjoining frame 214 or 216.

In accordance with one embodiment, a recursive formula is applied. Initially, a soft count of the cumulative video frames whose pixel intensities will play a role in modifying the pixel intensities of the selected video frame is calculated. In one embodiment, the soft count $S_t$ is determined in accordance with Eq. 7.

$$S_t = 1 + c_t {}^* S_{t-1} \qquad \text{Eq. 7}$$

In Eq. 7, $c_t$ corresponds to the change c for the pixel of the selected video frame 212 at time t. For the exemplary embodiment, the change c is a value between 0 and 1. $S_{t-1}$ is the soft count corresponding to the adjoining video frame 214 or 216.

The new or modified intensity $I_{M,t}$ of the pixel of the selected video frame 212 is then given by Eq. 8 where $I_t$ is the original intensity of the pixel of the selected video frame 212, $c_t$ is the change for the pixel and $I_{M,t-1}$ is the intensity of the corresponding pixel of the adjoining modified video frame 214 or 216.

$$I_{M,t} = (I_t + c_t S_{t-1} I_{M,t-1}))/S_t \qquad \text{Eq. 8}$$

After calculating the modified intensities for all or a plurality of the pixels of the selected video frame 212, a corresponding modified video frame is formed for the selected video frame, as indicated at 222.

In accordance with another embodiment, the intensity of each of the pixels 204 of the selected video frame 212 is determined based on a plurality of the video frames 202 that precede the selected video frame 212. In one embodiment, when the changes for the corresponding pixel in the preceding video frames (e.g., preceding 2-5 frames) are each less than a threshold change, then the intensity of the pixel of the selected video frame 212 is modified to the median value of the intensities of the corresponding pixels of the preceding video frames 202 and the intensity of the pixel of the selected video frame 212.

In one embodiment, steps 218, 220 and 222 are repeated for a plurality of selected video frames 202.

In one embodiment, the adjoining video frame 214 or 216 is deleted from the memory 210. Another video frame, such as the video frame that adjoins and succeeds the previously selected video frame is chosen as a new selected video frame 212. The previously selected video frame or the modified video frame corresponding to the previously selected video frame then becomes the adjoining video frame 214 or 216 of the newly selected video frame 212. The method then continues in accordance with the embodiments described above.

Preferably after the video frames 202 of the first video clip 200 have been processed to form the modified video frames 222, a second or modified video clip 224 is formed or built that comprises the modified video frames 222, as indicated at step 226.

In one embodiment, a post-processing technique 226 is applied to the second video clip. One embodiment of the post-processing technique 228 includes modifying the modified video frames 222 of the second video clip 224 using a filter. One exemplary filter is a spatial filter that is applied to a window centered at a given pixel and assigns the median value of the intensities within the window to the center pixel. This filter further removes sensor noise. Another exemplary filter is applied to a plurality of the modified video frames of the second video clip to improve the contrast of the images of the modified video frames. Other filters can also be applied to brighten the images of the modified video frames, improve coloration of the modified video frames, or make other desired adjustments.

In accordance with another embodiment, the first video clip 200 has a high frame rate. Accordingly the shutter speed setting for the camera that captured the first video clip was set to a high value. Embodiments of the high frame rate include frame rates of greater than 24 frames per second. In one embodiment, the second video clip 224 initially has the same frame rate of the first video clip 200.

One embodiment of the method includes adjusting or transforming the second video clip 224 to a frame rate that is lower than the frame rate of the first video clip 200, as indicated at 230. In one embodiment, the frame rate adjustment is accomplished by sampling the modified video frames 222 of the second video clip 224 at the desired frame rate.

For example, if the high frame rate first video clip 200 and the second video clip 224 as initially formed is 72 frames per second, and the desired low frame rate is 24 frames per second, the modified video frames 222 of the second video clip 224 can be formed at the desired frame rate by sampling the second video clip 224 at a rate of one of every three sequential modified video frames 222. The second video clip 232 having the low frame rate is then formed using only the selected or sampled modified video frames 222. As a result, several of the modified video frames 222 of the second video clip 224 at the high frame rate are discarded in the step 230.

In the event that the high frame rate is not evenly divisible by the desired low frame rate, the sampling of the modified video frames 222 of the second video clip 224 can include a merging of some of the modified video frames 222. For example, if the high frame rate is 100 frames per second and the desired low frame rate is 30 frames per second, it will be necessary to select or sample one of every 3.3 of the modified video frames 222. In one embodiment, a merged video frame is calculated in which the intensities of the pixels are set to the average of the corresponding pixels in the two closest modified video frames.

In accordance with another embodiment, the intensities of the pixels of the merged video frame are set to a weighted average of the corresponding pixels in the two closest modified video frames 222. For example, if it is desired to sample the modified frame 3.3, which is between the third and the fourth modified video frames 222, the intensities ($I_{3.3}$) of the pixels of the merged video frame can each be set in accordance with Eq. 9.

$$I_{3.3}=(0.7*I_3+0.3*I_4)/2 \qquad \text{Eq. 9}$$

In Eq. 9, $I_3$ represents the intensity of the pixel in the third modified video frame 222 and $I_4$ represents the intensity of the pixel in the fourth modified video frame 222.

In one embodiment, post processing techniques, such as those described above, are applied to the low frame rate second video clip, as indicated at 234.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of processing a first video clip comprising a plurality of video frames each having a plurality of pixels, the method comprising:
   providing a processor;
   for each of a plurality of selected video frames of the first video clip, forming a modified video frame comprising modifying an intensity of each of a plurality of the pixels of the selected video frame based on the intensity of the pixel, a change in intensity of the pixel from the corresponding pixel of another video frame, and the intensity of the corresponding pixel in one of an adjoining video frame that precedes the selected video frame and a modified video frame corresponding to the adjoining video frame using the processor; and
   forming a second video clip comprising the modified video frames using the processor.

2. The method of claim 1 further comprising calculating the change for each of the plurality of the pixels of the selected video frame including calculating a difference between the intensity of the pixel of the selected video frame and the corresponding pixel of one of the adjoining video frame and the modified video frame corresponding to the adjoining video frame.

3. The method of claim 2, wherein modifying an intensity of each of a plurality of the pixels of the selected video frame comprises comparing the difference between the intensity of each of the plurality of pixels of the selected video frame to the corresponding pixels of the adjoining frame to a threshold change, and only modifying the intensity of the pixels of the selected video frame whose change reaches a predetermined relationship to the threshold change.

4. The method of claim 1 further comprising transforming the second video clip to a frame rate that is lower than a frame rate of the first video clip.

5. The method of claim 4, wherein transforming the second video clip to a frame rate that is lower than a frame rate of the first video clip includes sampling the modified video frames of the second video clip.

6. The method of claim 1, wherein forming a modified video frame comprises modifying the intensity of each of a plurality of the pixels of the selected video frames based on the change in the intensity of only the pixel of the selected video frame and the corresponding pixel in one of the adjoining video frame and the modified video frame corresponding to the adjoining video frame.

7. The method of claim 1, wherein forming a modified video frame comprises modifying the intensity of each of a plurality of the pixels of the selected video frames based on the corresponding pixel in one of a plurality of preceding video frames of the first video clip and the modified video frames corresponding to the plurality of preceding video frames of the first video clip.

8. The method of claim 1 further comprising modifying the modified video frames of the second video clip using a filter.

9. A method of processing a first video clip comprising a plurality of video frames each having a plurality of pixels, the method comprising the following steps:
 providing a processor;
 selecting one of the video frames of the first video clip using the processor;
 calculating a change in intensity of each of a plurality of the pixels of the selected video frame from the intensity of the corresponding pixel in an adjoining video frame that precedes the selected video frame using the processor;
 comparing the changes in intensity to a threshold change using the processor;
 forming a modified video frame comprising modifying the intensity of each of the plurality of the pixels of the selected video frame whose change in intensity reaches a predetermined relationship to the threshold change based on the intensity of the pixel of the selected video fame and the intensity of the corresponding pixel of one of the adjoining video frame and the modified video frame corresponding to the adjoining video frame using the processor;
 repeating the selecting step, the calculating step and the forming step for a plurality of video frames of the original video clip; and
 forming a second video clip containing the modified video frames using the processor.

10. The method of claim 9 further comprising not modifying the intensity of the pixels of the selected video frame whose change does not reach the predetermined relationship to the threshold change in the modifying the intensity of each of the plurality of the pixels of the selected video frame.

11. The method of claim 9, further comprising transforming the second video clip to a frame rate that is lower than a frame rate of the first video clip.

12. The method of claim 11, wherein the transforming the second video clip to a frame rate that is lower than a frame rate of the first video clip includes sampling the modified video frames of the second video clip.

13. The method of claim 9, wherein forming a modified video frame comprises modifying the intensity of each of a plurality of the pixels of the selected video frame based on the corresponding pixel in one of a plurality of preceding video frames of the first video clip and the modified video frames corresponding to the plurality of preceding video frames of the first video clip.

14. The method of claim 9 further comprising modifying the modified video frames of the second video clip using a filter.

15. A computer readable medium containing instructions executable by one or more processors comprising:
 instructions for receiving a first video clip comprising a plurality of video frames each having a plurality of pixels;
 instructions for selecting one of the video frames of the first video clip;
 instructions for storing the selected video frame in memory;
 instructions for storing an adjoining video frame of the first video clip that precedes the selected video frame and adjoins the selected video frame in memory;
 instructions for calculating a change in intensity of each of a plurality of the pixels of the selected video frame from the corresponding pixel in the adjoining video frame;
 instructions for forming a modified video frame comprising modifying the intensity of each of a plurality of the pixels of the selected video frame based on the corresponding change, the intensity of the pixel of the selected video frame and the intensity of the corresponding pixel of one of the adjoining video frame and a modified video frame corresponding to the adjoining video frame;
 instructions for repeating the selecting step, the storing steps, the calculating step and the forming step for a plurality of the video frames of the first video clip; and
 instructions for forming a second video clip comprising the modified video frames.

16. The computer readable medium of claim 15 further comprising instructions for storing the second video clip in memory.

17. The computer readable medium of claim 15 further comprising instructions for deleting the adjoining video frame corresponding to the selected video frame from the memory after the forming a modified video frame.

18. The computer readable medium of claim 15 further comprising instructions for adjusting a frame rate of the second video clip to a frame rate that is lower than a frame rate of the first video clip.

19. The computer readable medium of claim 15, wherein the instructions for adjusting a frame rate of the second video clip comprise instructions for sampling the modified video frames of the second video clip.

20. The computer readable medium of claim 15 further comprising instructions for modifying the modified video frames of the second video clip using a filter.

* * * * *